United States Patent [19]

Hergenrother et al.

[11] 4,157,430

[45] Jun. 5, 1979

[54] AMINE TERMINATED POLYMERS AND THE FORMATION OF BLOCK COPOLYMERS

[75] Inventors: William L. Hergenrother; Richard A. Schwarz, both of Akron; Richard J. Ambrose, Fairlawn; Robert A. Hayes, Cuyahoga Falls, all of Ohio

[73] Assignee: The Firestone Tire & Rubber Company, Akron, Ohio

[21] Appl. No.: 792,284

[22] Filed: Apr. 29, 1977

Related U.S. Application Data

[62] Division of Ser. No. 574,676, May 5, 1975, Pat. No. 4,070,344.

[51] Int. Cl.$^2$ ............................ C08J 9/10; C08L 77/06
[52] U.S. Cl. ............................... 521/137; 260/857 G; 260/857 D; 521/95; 521/128; 521/139; 521/140; 526/16; 526/20; 526/21; 526/23; 528/75
[58] Field of Search ............... 260/77.5 CR, 2.5 N, 260/857 G

[56] References Cited

U.S. PATENT DOCUMENTS

| 3,017,392 | 1/1962 | Butler et al. ....................... 260/78 L |
| 3,135,716 | 6/1964 | Uraneck et al. ............. 260/77.5 CR |
| 3,225,119 | 12/1965 | Baker ................................... 260/874 |
| 3,281,383 | 10/1966 | Zelinski et al. ..................... 260/23.7 |
| 3,331,730 | 7/1967 | Bean et al. ............................ 260/844 |
| 3,332,917 | 7/1967 | Hsieh ........................... 260/77.5 CR |
| 3,595,941 | 7/1971 | Farrah et al. ........................ 260/879 |
| 3,838,108 | 9/1974 | Hergenrother et al. ..... 260/77.5 CR |
| 3,859,382 | 1/1975 | Hergenrother et al. ........ 260/857 G |
| 3,887,643 | 6/1975 | Selman ........................... 260/857 G |

FOREIGN PATENT DOCUMENTS

| 6612301 | 3/1967 | Netherlands. |
| 1131549 | 10/1968 | United Kingdom. |
| 1137046 | 12/1968 | United Kingdom. |

OTHER PUBLICATIONS

Mottus et al., *Polymer Preprints*, vol. 9 (1), 390 (1968).

*Primary Examiner*—Walter C. Danison

[57] ABSTRACT

Polymers of anionically polymerized monomers such as conjugated dienes, vinyl substituted aromatics, olefinic type compounds, and heterocyclic nitrogen containing compounds, are produced and end capped with a polyisocyanate or polyisothiocyanate. Such end capped polymers are then reacted with compounds containing an amide such as lactam to give an imide type end group. The imide type terminated polymer is hydrolyzed to form a stable amine terminated polymer which may be utilized, as a composition of matter or stored for a short period of time to an extended period of time and reacted with other various polymers and monomers, or various combinations of monomers to form various block or graft polymers. That is the amine polymer may be subsequently reacted with any amine reactive compound such as with a polyisocyanate or polyisothiocyanate and a lactam in the presence of a known anionic lactam polymerization catalysts to give a blocked nylon copolymer. Similarly, other block or graft copolymers may be obtained by reacting amine reactive compounds such as various monomers or polymers with the terminated amine polymer and examples of amine reactive polymers include polyepoxy, polyurea-aldehyde, polyphenol-aldehyde, polyamide, polyurea-urethane, polyurethane, polyimide, polyurea and similar polymer segments. Of course, identical or similar polymer forming reagents such as monomers as well as identical or similar prepolymers may also be used.

11 Claims, No Drawings

AMINE TERMINATED POLYMERS AND THE FORMATION OF BLOCK COPOLYMERS

CROSS-REFERENCE

This is a division of U.S. patent application Ser. No. 574,676, filed May 5, 1975, now U.S. Pat. No. 4,070,344.

BACKGROUND OF THE INVENTION

The present invention relates to the anionic polymerization of generally olefinic type polymers and the termination thereof with an amine end group. More specifically, the present invention relates to the formation of amine terminated anionically polymerizable polymers which are stable and yet can be reacted with amine reactive compounds such as monomers or polymers to form block copolymers. Such block copolymers are generally easily processed in a manner typical of the anionically produced polymers such as elastomers but yet, upon cure, exhibit properties typical of the other constituent. A specific aspect of the present invention therefore relates to the formation of an elastomer type epoxy block copolymer. In another specific aspect, the present invention relates to the formation of an elastomer type urea-formaldehyde graft copolymer. In yet another specific aspect, the present invention relates to the formation of an elastomer type acetalized polyvinyl alcohol graft copolymer. In yet another specific aspect, the present invention relates to the formation of an elastomer type phenol-formaldehyde graft copolymer. In yet another specific aspect, the present invention relates to the formation of an elastomer type nylon block copolymer. In yet another specific aspect, the present invention relates to the formation of an elastomer type urea block copolymer. In yet another specific aspect, the present invention relates to the formation of an elastomer type urea-urethane block copolymer.

In yet another specific aspect, the present invention relates to the formation of an elastomer type urethane block copolymer. In yet another specific aspect, the present invention relates to the formation of an elastomer type imide block copolymer.

The polymerization of conjugated dienes and/or vinyl substituted aromatic compounds with organo alkali metal initiators in well known in the art. The resulting alkali metal terminated polymers are often reacted with polyfunctional compounds to couple the polymers, for example U.S. Pat. Nos. 3,135,716; 3,468,972; 3,225,119 and 3,281,383. However, none of these patents disclose the preparation of anionically polymerized polymers which contain a terminal amine. Moreover, anionic polymers used in the preparation of block copolymers having a constituent other than the initial constituent is not disclosed.

Various inventions exist which utilize amines for various purposes. For example, U.S. Pat. No. 3,017,392, relates to the formation of linear polyamides by the polymerization of lactams. The polymerization is carried out in the presence of a tertiary-nitrogen atom containing compound and a molecular weight-regulating concentration of a primary or secondary amine. In U.S. Pat. No. 3,028,369, a polymerization of lactams is enhanced by the addition of an organic isocyanate used as an initiator or promoter. In an article by Mottus, Hendrick and Butler, Polymer Preprints, 9 (1), 390 (1968), it is stated that the initial polymerization of caprolactam can be controlled with use of amine modifiers to give products over a wide range of molecular weights. Primary amines are effective as modifiers with secondary amines showing less modifying action and tertiary amines being inactive. The control is hypothesized to involve chain termination and acyl transfer. However, none of these patents suggest the amine termination of an anionically polymerized polymer which may be utilized in the formation of block copolymers.

In U.S. Ser. No. 219,161, now U.S. Pat. No. 3,838,108, there is disclosed the formation of various block copolymers. However, the block copolymers disclosed in U.S. Pat. No. 3,838,108, generally had to be made in one continuous process since the anionically polymerized polymer with isocyanate or polyisothiocyanate end caps tended to be unstable and could not be stored for any appreciable period of time. That is, moisture or active hydrogen containing impurities would react with the highly reactive isocyanate and prevent the formation of the desired block copolymer. Moreover, in the absence of active hydrogen compounds trimerization or dimerization of the isocyanate or isothiocyanate may occur. The requirement of a continuous polymerization is at times uneconomical and impractical, especially when tailor made products are desired. Moreover, another disadvantage of the continuous formation of the block copolymer is that due to various parameters involved, the precise percentage of polyolefin type polymer end capped by an isothiocyanate or isocyanate would vary from time to time and generally was very difficult to control or to determine immediately. Such variation tended to produce block copolymers of less than optimum and sometimes undesirable properties in situations wherein a precise stoichiometric amount of monomer or polymer was required as in the formation of a polyimide block copolymer.

Moreover, many patents have disclosed the combination of phenolic resins with rubber stocks for use as tire cord dips and/or adhesives. These patents generally depend upon the reaction of the phenolic hydroxyl for joining the two materials, for example British Pat. Nos. 1,137,046 and 1,131,549, or use phenolic compounds which contain polymeric or oligomeric substituents, for example Netherlands Pat. No. 6,612,301. Moreover, unusual or exotic type catalysts are required such as a metallic cocatalyst as in British Pat. No. 1,137,046 or $BF_3$ as in Netherlands Application No. 6,612,301. The present invention does not require any catalyst or precautions beyond that known to the preparation of phenolic resins. Rather, the present invention relates to the preparation of block copolymers which are capable of being cured to give thermosetting resins which can be used as adhesives and when mineral filled and compounded show good flexural strength (greater than 11,000 psi) and good flexural modulus (greater than 990,000 psi), coupled with high heat distortion (230° C. at 264 psi). The graft copolymers are prepared by reacting phenol-aldehyde materials with amine terminated polymers to form the graft copolymer.

U.S. Pat. No. 3,331,730 relates to the preparation of phenolic resins esterified with unsaturated monocarboxylic acids and laminates therefrom. Once again, a polymer is prepared through reaction of the phenolic hydroxyl groups and results in a completely different polymer.

SUMMARY OF THE INVENTION

It is, therefore, an object of the present invention to produce anionically prepared polymers which are amine terminated.

It is also an object of the present invention to produce anionically prepared polymers which are reacted with either polyisocyanates or polyisothiocyanates, further reacted with an amide compound, and then hydrolyzed to form an amine terminated polymer.

It is another object of the present invention to produce an amine terminated polymer, as above, wherein said amide compounds are lactams.

It is yet another object of the present invention to produce amine terminated polymers, as above, which may be stored for extended periods of time.

It is yet another object of the present invention to produce amine terminated polymers, as above, which may be subsequently reacted with amine reactive compounds such as monomers, oligomers or polymers containing an amine reactive compound to produce graft or block copolymers.

It is yet another object of the present invention to produce amine terminated polymer, as above, which can be reacted with lactams by nylon activators to form nylon block copolymers.

It is yet another object of the present invention to produce amine terminated polymers, as above, which can be reacted with various monomers or polymers to form tailor made block copolymers.

It is yet another object of the present invention to produce amine terminated polymers, as above, which can be reacted with a precise and accurate amount of monomers or polymers to form block copolymers of very high physical properties.

It is yet another object of the present invention to produce amine terminated polymers, as above, which can be reacted to form block copolymers in which the amine terminated portion of a block copolymer is an elastomer.

It is yet another object of the present invention to produce amine terminated polymers, as above, which can be further reacted with epoxy containing monomers or polymers to produce an epoxy block copolymer.

It is yet another object of the present invention to produce amine terminated polymers which can be further reacted with urea-aldehyde forming monomers or polymers to produce a urea-aldehyde copolymer.

It is yet another object of the present invention to produce amine terminated polymers which can be further reacted with urea forming monomers or polymers to produce a urea block copolymer.

It is yet another object of the present invention to produce amine terminated polymers which can further be reacted with acetalized polyvinyl alcohol forming monomer or polymers to produce acetalized polyvinyl alcohol copolymers.

It is yet another object of the present invention to produce amine terminated polymers which can be further reacted with phenol-aldehyde forming monomers or polymers to produce phenol-aldehyde copolymers.

It is yet another object of the present invention to produce amine terminated polymers which can be further reacted with nylon forming monomers or polymers to produce nylon block copolymers.

It is yet another object of the present invention to produce amine terminated polymers which can be further reacted with urethane forming monomers or polymers to produce urethane block copolymers.

It is yet another object of the present invention to produce amine terminated polymers which can be further reacted with urea-urethane forming monomers or polymers to produce urea-urethane block copolymers.

It is yet another object of the present invention to produce amine terminated polymers which can be further reacted with imide forming monomers or polymers to produce imide block copolymers.

These and other objects of the present invention will become apparent from the following specification which describes in detail various embodiments without attempting to discuss all of the modifications in which the invention might be embodied; the invention being measured by the appended claims and not by the details of the specification.

In general, an amine terminated polymer composition comprises an amine group attached to the polymer, said polymer produced from monomers selected from the class consisting of olefin, conjugated diene, vinyl substituted aromatic, vinyl substituted pyridine, vinyl substituted quinoline,

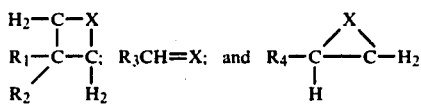

Where $R_1$, $R_2$, $R_3$, and $R_4$ are selected from the group consisting of an aliphatic containing from one to fifteen carbon atoms, a cycloaliphatic containing from four to fifteen carbon atoms and an aromatic containing from six to fifteen carbon atoms and mixtures thereof; where $R_4$ is also an H, and where X is O or S.

In general, an amine terminated polymer composition comprises an end capped polymer reacted with an amide compound to form an imide terminated polymer, said terminated polymer hydrolyzed to produce said amine terminated polymer, said end capped polymer containing an anionic polymerized polymer connected to a compound selected from the group consisting of polyisocyanate and polyisothiocyanate through one of the isocyanate or isothiocyanate groups, said anionic polymerized polymer produced from monomers selected from the group consisting of olefin, conjugated diene, vinyl substituted aromatic, vinyl substituted pyridine, vinyl substituted quinoline,

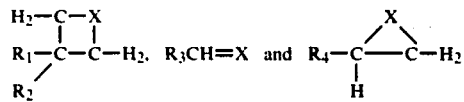

where $R_1$, $R_2$, $R_3$, and $R_4$ are selected from the group consisting of an aliphatic containing from 1 to 15 carbon atoms, a cycloaliphatic containing from 4 to 15 carbon atoms and an aromatic containing from 6 to 15 carbon atoms and mixtures thereof; where $R_4$ is also an H; and where X is O or S. The amine terminated polymers may be utilized or further reacted with compounds containing an amine reactive group such as various monomers or polymers to produce block or graft copolymers.

Reaction of the amine terminated polymers with nylon forming monomers or polymers under appropriate conditions will produce a nylon block copolymer. Similarly, reaction with urea and formaldehyde forming monomers or polymers will produce ureaaldehyde block copolymers. Reaction with epoxy containing monomers or polymers will produce epoxy block or graft copolymers. Reaction with phenol and aldehyde monomers or polymers will produce phenol-aldehyde block or graft copolymers. Reaction with urea forming monomers or polymers will produce urea block copolymers. Reaction with urethane forming monomers or polymers will produce urethane block copolymers. Reaction with urea and urethane forming monomers or polymers will produce urea-urethane block copolymers. Reaction with imide forming monomers or polymers will produce imide block copolymers.

PREFERRED EMBODIMENTS OF THE INVENTION

The monomers which can be anionically polmerized by initiators such as described herein to form an anionically prepared polymer and then reacted with the polyisocyanates or polyisothiocyanates also described herein to form end capped polymers include a wide variety of materials. Generally, any monomer capable of undergoing anionic polymerization can be used. Some of these monomers can be generally classified as olefins since they contain at least one olefinic group and may be represented by the following structural formulae, wherein R is hydrogen, alkyl, cycloalkyl, an aromatic ring or substituted aromatic ring containing from 1 to 15 carbon atoms:

1. $CH_2=CACN$ wherein A is $CN$, $CF_3$, $CH_3$, or H
2. $CH_2=CACO_2R$ wherein A is $CO_2R$, $SO_2R$, $CH_3$ or H
3. $CH_2=CANO_2$ wherein A is Cl, $CH_3$ or H
4. $CH_2=CACON(R)_2$ wherein A is $CH_3$ or H Other monomers which can be anionically polymerized are represented by the following structural formulae:

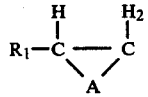  5.

where A is O or S and R is H or an aliphatic, cycloaliphatic or aromatic group or mixtures thereof containing from 1 to 15 carbon atoms, inclusive.

  6.

Where A is O or S and R is an aliphatic, cycloaliphatic, or aromatic group or mixtures thereof containing from 1 to 15 carbon atoms, inclusive.

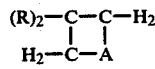  7.

where A is O or S and R is an aliphatic, cycloaliphatic of aromatic group or mixtures thereof containing from 1 to 15 carbon atoms, inclusive

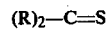  8.

where R is an aliphatic, cycloaliphatic or aromatic group or mixtures thereof containing from 1 to 15 carbon atoms, inclusive.

The monomers as represented by formulae 5, 6, 7 and 8 are preferred in the subject invention. Examples of such monomers include ethylene oxide, propylene oxide, styrene oxide, ethylene sulfide, propylene sulfide, styrene sulfide, acetaldehyde, propionaldehyde, isobutyraldehyde, n-caproaldehyde, acetothioaldehyde, propionthioaldehyde, isobutyrthioaldehyde, n-caprothioaldehyde, 3-dimenthyloxycyclobutane, 3-diethyloxycyclobutaine, 3-methylethyloxycyclobutane, 3-dimethylthiocyclobutane, 3diethylthiocyclobutane, 3-methylethylthiocyclobutane, methyl ethyl thioketone, methyl isopropyl thioketone and diethyl thioketone. Suitable monomers represented by formula No. 8 do not include large R groups such as two phenyl groups since such monomers are difficult to polymerize due most probably to stearic hindrance.

Other preferred monomers which may generally be used to prepare the isocyanate terminated polymers of this invention are the conjugated dienes and the vinyl substituted aromatic compounds. The conjugated dienes ordinarily contain from 4 to 12 carbon atoms and preferably from 4 to 8 carbon atoms. Examples of such dienes include 1,3-butadiene; isoprene; 2,3-dimethyl-1,3-butadiene; 2-methyl-1,3-pentadiene; 3,4dimethyl-1,3-hexadiene; 4,5-diethyl-1,3-octadiene; 3-butyl-1,3-octadiene; phenyl-1,3-butadiene and the like. The vinyl substituted aromatic compounds include styrene, 1-vinylnaphthalene, 2-vinylnaphthalene, and the alkyl, cycloalkyl, aryl, alkaryl and aralkyl derivatives thereof in which the total number of carbon atoms in the combined substituents is generally from 7 but not greater than 12. Examples of such compounds include 3-methylstyrene vinyltoluene; alpha-methylstyrene; 4-n-propylstyrene, 4-t-butylstyrene, 4-dodecylstyrene, 4-cyclohexylstyrene; 2-ethyl-4-benzylstyrene; 4-methoxystyrene; 4-dimethylaminostyrene; 3,5-diphenoxystyrene; 4-p-tolylstyrene; 4-phenylstyrene; 4,5-dimethyl-1-vinylnaphthalene; 3-n-propyl-2-vinylnaphthalene and the like.

The conjugated dienes and the vinyl substituted aromatic compounds as well as many of the other monomers noted herein generally can be polymerized alone or in a mixture to form homopolymers, copolymers or block copolymers which serve as the base polymer. The dienes which are preferred are 1,3-butadiene and isoprene, and preferred vinyl substituted aromatic monomers are styrene, alpha-methylstyrene and 4-t-butylstyrene. A preferred copolymer is styrene→butadiene.

Yet another group of monomers which can be employed are the heterocyclic nitrogen containing monomers such as pyridine and quinoline derivatives containing at least 1-vinyl or an alpha-methylvinyl group such as 2-vinylpyridine, 3-vinylpyridine, 4-vinylpyridine, 3-ethyl-5-vinylpyridine, 3-methyl-5-vinylpyridine, 3-5-diethyl-4-vinylpyridine and similar mono- and di-substituted alkaryl pyridines, and the like; quinolines such as 2-vinylquinoline, 3-vinylquinoline, 4-vinylquinoline and so forth. In general, the various vinyl substituted pyridines and vinyl substituted quinolines are also preferred monomers.

Monomers which are highly preferred are the rubber forming monomers such as the conjugated dienes and mixtures of dienes and vinyl substituted aromatics such as butadiene-styrene.

The polymers are prepared by anionically polymerizing the monomers with conventional anionic initiators such as organo alkali metal initiators in a manner which is well known to those skilled in the art. Although these initiators can be either mono- or poly-functional, the mono-functional initiators are preferred for the present invention.

The preferred metal is lithium although sodium, potassium, rubidium and cesium are generally suitable. Hence, the preferred class of compounds can be represented by the formula RLi wherein R is a hydrocarbon radical selected from the group consisting of aliphatic, cycloaliphatic and aromatic radicals containing from 1 to 30 carbon atoms per molecule. Examples of these initiators include methyllithium, n-butyllithium, n-amyllithium, n-decyllithium, phenyllithium, naphthyllithium, p-tolyllithium, 9-fluorenyllithium, cyclohexyllithium, eicosyllithium, and the like with n-butyllithium being highly preferred. The essential feature of these initiators is that they possess a carbonlithium bond which acts on the point of initiation for the polymerization. The growth of the polymer is also propagated through the carbonlithium bond which becomes a part of the polymer at this stage. Of the resulting polymers obtained, substantially all have a lithium atom positioned at one end.

The amount of catalyst employed depends primarily on the monomers to be used and the characteristics desired in the polymer produced. In general, an increased amount of catalyst leads to the production of a lower molecular weight polymer whereas a reduced amount of catalyst has an opposite effect. Suitable polymers having a molecular weight in the range of 3000 to about 100,000 can be readily prepared, ordinarily by using initiator levels in the range of about 33.3 to 1 millimoles per 100 grams of monomer (mhm). Of course, polymers of higher or lower molecular weights can be prepared by varying the initiator level. Thus, polymers of high molecular weights which may be viscous or solid can be produced by using an initiator level of approximately 0.25 mhm or less. Generally, the initiator level for this invention is commonly in the range of about 20 to about 5 (mhm) since a desired molecular weight range is of from about 5,000 to about 20,000 for most amine terminated polymers.

Formation of the polymers is generally carried out at a temperature in the range between $-100°$ and $+150°$ C. and preferably between $-78°$ and $50°$ C. with temperatures at the lower part of the range being desirable at this stage. The precise temperature of polymerization, of course, will depend to a large degree upon the particular reactivities of the monomers being reacted. The pressure will generally be low, that is approximately 1 atmosphere or higher and is usually related to the monomer and solvent volatilities. For example, with ethylene higher pressures are encountered than with butadiene or styrene.

The process or the polymerizations are generally carried out in a hydrocarbon or ether medium. Normally, the solvents or diluents are paraffins, cycloparaffins or aromatics containing from 4 to 10 carbon atoms per molecule. Examples of solvents include n-butane, n-hexane, n-heptane, isooctane, cyclohexane, methylcyclohexene, benzene, toluene, xylene, tetrahydrofuran dimethyl ether and the like. The important considerations in selecting solvents are that they should be inert, they should have some affinity for the polymer formed and they should not contain in their structure any active hydrogen atoms, or any impurities having an active hydrogen atom such as water, alcohols, or acids groups which would have a tendency to act as a chain terminating or transfer agent.

In accordance with the concepts of the present invention, the anionically prepared polymers are reacted usually with a single polyisocyanate or a polyisothiocyanate monomer to produce end capped polymers having at least one unreacted isocyanate or isothiocyanate end portion. The terms polyisocyanate and polyisothiocyanate are used in this specification in the sense that the compounds described by these terms are polyfunctional and therefore may react with two or more entities. The polyisocyanates and the polyisothiocyanates are preferably those compounds represented by the formula $R(N=C=X)_n$ where R can be an aliphatic containing from 2 to about 20 carbon atoms, a cycloaliphatic containing from 4 to about 20 carbon atoms, an aromatic containing from 6 to about 20 carbon atoms or combinations thereof, n is an integer such as 2 or 3, with 2 being highly preferred, and x is a chalcogen (oxygen or sulfur). Examples of polyisocyanates include diphenyl diisocyanates, 2,4,4'-triisocyanatediphenyl ether, triphenyl methane triisocyanate, benzene-1,2,4-triisocyanate, naphthalene-1,3,7-triisocyanate and the like. Highly preferred diisocyanates include meta or para-phenylene diisocyanate, diphenyl methane diisocyanates, bitolylene diisocyanates, dianisidine diisocyanates, isophorone diisocyanates, toluene diisocyanates, hexamethylene diisocyanate and pentamethylene diisocyanate. Examples of polyisothiocyanates generally include compounds which are the same as the polyisocyanates but wherein, of course, a sulfur atom has been substituted for the oxygen atom. Thus, suitable polyisothiocyanates include diphenyl diisothiocyanates, 2,4,4'-triisothiocyanate-diphenyl ether, triphenyl methane triisothiocyanate, benzene-1,2,4-triisothiocyanate, naphthalene-1,3,7-triisothiocyanate and the like. Preferred diisothiocyanates include meta or para-phenylene diisothiocyanate, diphenyl methane diisothiocyanates, bitolylene diisothiocyanates, dianisidine diisothiocyanates, toluene diisothiocyanates, hexamethylene diisothiocyanate and pentamethylene diisothiocyanate.

Henceforth, in the specification, whenever reference is made to an isocyanate or polyisocyanate compound, it is to be understood that such reference also usually includes isothiocyanate or polyisothiocyanate compounds.

The amounts of polyfunctional isocyanates which may be used generally depend upon the particular system to be produced. For most systems, the equivalent ratio of the polyisocyanates to the alkali metal or lithium present in the polymers may range from 1.1 to about 20 while in other systems the upper limit of the range may be in excess of 100. When a polyisocyanate is employed to react with the lithium terminated or base polymers, each polyfunctional isocyanate will sometimes react with more than one lithium terminated polymer, thereby coupling the polymers and forming a resulting polymer which does not contain an isocyanate group on an end portion of the polymer. This situation generally cannot be avoided and therefore to achieve a fair amount of polymers which have at least one isocyanate end group, the equivalent ratio of one isocyanate end group, the equivalent ratio of the polyfunctional isocyanates to the lithium must be greater than 1.0. Should the equivalent ratio be less than one but greater than 0.5 the resultant polymeric solution may contain, and when the equivalent ratio is 0.5 or less the resultant polymeric solution will likely contain, some unreacted lithium terminated polymers. When the equivalent ratio is approximately 2.0, statistical consideration reveal that when a diisocyanate is employed, approximately 50% of the polymers have an isocyanate end group. When a triisocyanate is employed with an equivalent ratio of three, the amount of polymers which are terminated by at least one unreacted isocyanate group is increased to approximately 67%. In general, as the equivalent ratio increases, the percentage of isocyanate terminated polymers increases as well as the amount of completely unreacted or free polyisocyanates. Generally, an amount of polyisocyanate should be used so that at least 5% and preferably at least 20% of the polymers are terminated by at least one isocyanate group. An amount of 30% to about 65% or above is highly desirable or highly preferred. Usually, as a practical matter, it is difficult to achieve amounts in excess of 65% anionic polymerized polymers end capped with a free isocyanate group due to coupling. As should be apparent to one skilled in the art, the addition of polyfunctional isocyanates should be carried out rapidly to avoid excessive coupling.

During the process of formation of the isocyanate end capped polymers it is important that the reaction be carried out in an environment substantially free from active hydrogen compounds such as water, alcohol or acids so that the polymers are terminated by an isocyanate group. Hence, the process is usually carried out in an inert atmosphere such as in a nitrogen atmosphere.

The temperature range for the polyfunctional isocyanate reaction is generally between $-100°$ and $+150°$ C., and preferably between $-78°$ and $+70°$ C. It has been found that temperatures at the lower end of the preferred range produced better results, possibly since polyfunctional isocyanate consuming side reactions are reduced.

The preparation of the end capped anionically produced polymers will be more fully understood by referring to the following examples.

EXAMPLE I—1,2-POLYBUTADIENE

To a clean, dry, nitrogen purged 28 oz. beverage bottle was added 600 cc of purified tetrahydrofuran, and 77.6 g of butadiene. After cooling to $-20°$ C., 1.52 cc of 1.64 molar ($2.49 \times 10^{-3}$ moles) n-butyllithium in a hexane solution was added and held at $-20°$ C. for four hours until the butadiene had polymerized. To this lithium polybutadiene, which was 85% 1,2-microstructure, was added rapidly 5.92 cc of a 1.22 molar ($7.21 \times 10^{-3}$ moles) toluene diisocyanate solution in toluene. The resulting polymer had an average molecular weight of 31,000.

EXAMPLE II—1,4-POLYBUTADIENE

To a clean, dry 28 oz. beverage bottle was added 500–600 cc of purified toluene, 98.1 g of butadiene and 1.43 c of 1.75 molar ($2.5 \times 10^{-3}$ moles) n-butyllithium in a hexane solution. The bottle was stirred magnetically overnight at 25° C. before rapidly adding 2.52 cc of 0.995 molar toluene diisocyanate ($2.5 \times 10^{-3}$ moles). This solution was stirred for one hour and the product was precipitated with methanol. The resulting 1,4-polybutadiene had a viscosity average molecular weight of 56,000 g/mole and a vinyl content of about 10%.

The above described polyisocyanate or polyisothiocyanate end capped polymers of the polymeric composition according to the concepts of the present invention are further reacted with an amide compound to give an imide type terminated polymer and then hydrolyzed to produce a stable amine terminated anionically prepared polymer. Such amine termined polymers have been found to be very stable or unreactive to moisture, impurities and the like and are stable for extended periods of time such as months and even years. Thus, the amine terminated polymers of the present invention are suitable wherever a continuous process for the production of block copolymers is not desired. Moreover, such amine terminated polymers can be shipped to various plants and stored before utilized. Additionally, the amine terminated compounds of the present invention are particularly suitable in processes wherein the precise stoichiometric relationship of the amine terminated compounds with respect to reactant compounds as in the formation of block copolymers is very important to the production of compounds which possess good physical properties. That is, due to the inherent factors involved in the production of polyisocyanate end capped anionically prepared polymers such as elastomers, the exact amount of end capped polymers which constitute further reaction sites are unknown at the time of production and hence often in a continuous process cannot be readily determined by chemical analysis until after the next succeeding reaction step has usually been carried out. Thus, off grade or poor products are often unintentionally produced and are difficult to avoid in such continuous processes. In the formation of block copolymers, knowledge of the specific amount of end capped or amine terminated polymers is very important when they are reacted with acid halides, imide and urea forming compounds or polymers.

Desirable amides include those which upon reaction with the isocyanate endcapped polymer produce an imide type structure which can then be hydrolyzed. Suitable amides include amides of ammonia or primary amines, lactams, sulfonic acid amides and sultams. Therefore amides having the formula

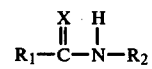

an amide of a primary amine, wherein $R_1$ and $R_2$ are preferably aliphatic and aromatic may be utilized, along with less desirable cycloaliphatic, as well as mixtures of aliphatic, cycloaliphatic and aromatic groups where $R_1$ and $R_2$ have from 1 to about 20 total carbon atoms and where X is O or S. Of course, $R_2$ may simply be a hydrogen. It is noted that amides of secondary amines or N.N-disubstituted amides cannot be used since they will not react with the isocyanate encapped polymers due to the lack of a hydrogen bonded to the nitrogen atom. Specific examples of amide compounds wherein X is an oxygen or a sulfur, $R_2$ is a hydrogen and $R_1$ is an alkyl, a preferred group, includes formamide, acetamide, stearamide, oleamide and the like. Examples wherein $R_1$ and/or $R_2$ are aromatic compounds include acetanilide, benzamide and benzanilide. Another and a highly preferred class of amide compounds are the internal or cycloaliphatic amides such as the lactams. Generally, lactams having from 3 to about 16 total carbon atoms may be utilized. Preferred lactams include caprolactam and capryllactam that is, lactams of primary amino acids. Additionally, the sultams may be utilized. Of course, the lactams and the sultams must contain an N—H group.

Additional amide type compounds can be utilized for the present invention wherein is replaced by an

group, for example, the sulfonic acid amides. Similarly, in the lactams, the

may be replaced by

to form a sultam of a primary amino sulfonic acid. A specific example includes benzene sulfonamide. Suitable solvents for the sulfone-amide compounds include hexane and tetrahydrofuran. Generally, the above amide compounds are preferred over the sulfonic acid amide and the sultam compounds.

Upon reaction of the amide type compounds with the isocyanate or isothiocyanate end capped polymer (i.e. Polymer

an imide type

structure is produced wherein the polymer terminal structure is generally as follows: Polymer

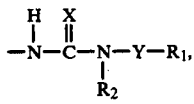

where X is O or S and Y is

or $SO_2$ wherein $R_1$ and $R_2$ are as set forth above. Such terminal structure of the polymer for the purposes of the present invention including the claims is to be understood as an imide type structure and is an intermediate in the production of the amine terminated polymer.

To insure that many of the end capped, anionically prepared polymers are eventually converted to amine terminated polymers, generally the mole ratio of amide compound is desirably from about 1.0 to about 10 and preferably about 2 with respect to the end capped polyisocyanate polymers. The amount of polyisocyanate utilized to react with the anionically prepared polymer is generally in excess of an equivalent amount as from 1.1 to about 20 and preferably a mole ratio of about 2 to insure that all anionically prepared polymers are end capped as well to insure that a high proportion of such end capped polymers are produced. Thus, in the case of the preferred mole ratio, the amount of amide compound to and anionically prepared polymer will be 4 to 1 where diisocyanate compounds are utilized and 6 to 1 where triisocyanate compounds are utilized. Thus, when a triisocyanate is utilized, the reacted polymer may contain two amine terminated groups.

The addition of the amide compound was generally carried out at a temperature range of about $-78°$ C. to about 50° C. and preferably at the range of from about 0° C. to about 30° C. Of course, the temperature will generally vary according to the type of amide compound utilized. At temperatures below the lower broad limit, anionic polymerization becomes unfeasible. In the case where the particular type of amide compound is a lactam, the addition temperature of the amide is desirably at the molten temperature of the lactam.

After an imide type terminated polymer is formed, it is hydrolyzed to produce the amine terminated anionically produced polymer. Hydrolysis, which will generally vary depending upon the type of amide compound, may usually be carried out from $-25°$ C. to about 100° C. with a temperature of about 15° C. generally being preferred especially when the amide is caprolactam.

The mole ratio of water to the imide groups is from about 1.0 to about 10 and preferably about 2. An excess amount is preferred, of course, to insure a large amount of amine terminated polymer and to reduce the amount of coupling occurring during hydrolysis. Thus, if the mole ratio of diisocyanate utilized is twice that of the expected anionically prepared chains, the preferred mole ratio of amide compound will be four and the preferred lower amount of water to the number of anionically prepared polymers will be about eight. Of course, larger or smaller amounts may be utilized with good results. Upon hydrolysis, the amide compound is separated from the polymer and carbon dioxide is given off thus producing an amine terminated polymer. Generally, if the above ranges of amide compound and water are utilized, the amount of isocyanate end capped polymers converted to amine terminated polymers is usually a minimum of 60% although with the preferred procedure conversions of greater than 90% are usually obtained.

When an excess of polyisocyanate material is employed, there will exist excess or free polyamine materials. The presence of such polyamines is usually deleterious to the properties of some of the copolymers, as for example 1,2-polybutadiene-nylon 6 block copolymer while in other situations its presence may be corrected for by an additional amount of reactant, as for example, additional diacid chloride when diacid chlorides and diamines are added to make nylons (in order to form the desired block copolymer). These are some of the reasons why it is generally undesirable to utilize a large excess of polyisocyanate, that is, above the preferred amount for the formation of the amine terminated polymers.

The invention will be better understood by reference to the following examples.

EXAMPLE III AMINE TERMINATED 1,4-POLYBUTADIENE

A clean, dry one-half gallon reactor fitted with a paddle type stirrer was charged with 1500 g of butadiene-hexane blend (25 wt % butadiene) which had been dried to less than 50 ppm water by circulation through 3A molecular sieves. The temperature was controlled at 80° F. by circulating water in the reactor jacket. Polymerization was initiated by addition of 25.0 ml of 1.55 N n-butyllithium in hexane. After a short period of exothermic heating the reaction temperature was maintained at 80° F. for 16 hr. A sample was taken for analysis, then 10.7 ml of Hylene T (DuPont 2,4-toluene diisocyanate) was added with rapid stirring. Aliquots (300 ml of cement) were charged into five dry, nitrogen purged 28 oz. beverage bottles containing 100 ml of dry distilled tetrahydrofuran and samples of various amides (see Table I). The polymer mixture remaining in the reactor was reacted with 5.7 g of molten caprolactam for 30 min. at 80° F. and then 10 ml of distilled water was added. The polymer cement from the reactor was stabilized with antioxidants and characterized as described below. The five bottle samples were placed in the 50° C. polymerization bath for the indicated times (see Table I). Completion of reaction of the amide with the isocyanate was taken to be a value of less than or equal to 0.1 for the ratio of the optical densities of the infra red absorptions for NCO (approximately 2260 cm$^{-1}$) to CH$_2$ (approximately 2850 cm$^{-1}$). The intermediate imides were then hydrolyzed by addition of 4 ml of distilled water. The overall coupling results from GPC measurements are given in Table I.

TABLE I

| Sample | Amide[a] | Reaction[b] time at 50° C. | % Coupling by GPC[d] |
|---|---|---|---|
| 1 | Acetamide | 2 hr. | 46.0 |
| 2 | Acetanilide | 2 hr. | 9.0 |
| 3 | Benzamide | 2 hr. | 49.0 |
| 4 | Benzanilide | 2 hr. | 54.0 |
| 5 | Benzene Sulfonamide | 22 hr.[c] | 79.0 |
| 6 | Caprolactam | 0.5 hr. | 37.0 |

[a]Charged at 2/1 amide/TDI mole ratio.
[b]Final NCO/CH$_2$ optical density ration ≦0.1.
[c]Required tertiery amine catalyst to react appreciably.
[d]Determined by comparison of the GPC curve of the amine-terminated polymer with that of the base 1,4-polybutadiene.

EXAMPLE IV

AMINE TERMINATED 1,2-POLYBUTADIENE

A clean, dry one-half gallon stainless steel reactor equipped with a paddle type stirrer was charged with 1 kg of butadiene in hexane (50 wt % blend) which had been dried to less than 50 ppm water by circulation though 3 A molecular sieves. The reaction mixture was cooled to −60° F. by circulation of refrigerated isopropanol through the reactor jacket. A modifier (15.2 ml of tetramethyl ethylene diamine) was added to promote the formation of high 1,2-microstructure. The polymerization was initiated by the addition of 50.0 ml of 1.62 M n-butyllithium in hexane and the temperature rose to 85° F. Cooling was maintained and the reaction temperature was held at −20° F. for 4.5 hr. A sample was taken for analysis of the polybutadiene (87% 1,2-microstructure, intrinsic viscosity of 0.205 at 25° C. in toluene). Then 14.3 ml of Hylene TM (DuPont 80/20 2,4-/2,6-toluene diisocyanate) was added rapidly with good agitation. A sample was taken for analysis and then 23.7 g of caprolactam in 125 ml of dry toluene was rapidly added. The reaction was stirred for 15 min. at −20° F. then 30 minutes at 180° F. After cooling to 50° F. 20 ml of distilled water was added followed by antioxidants. The gel permeation chromatography analysis indicated 38% of the polymer was coupled or 62% amine-terminated 1,2-polybutadiene present in the product.

EXAMPLE V

Pilot plant preparation of 1,2-amine terminated polybutadiene

A five hundred gallon stainless steel reactor fitted with a single contour blade turbine conforming to the reactor bottom was employed. The reactor was baffled at a level requiring 100–200 gallons of material to be effective. The reactor was cooled to approximately 0° F. by circulating coolant through the jacket. The reactor was then charged with 360 lbs. of dimethyl ether and 9.5 lbs of 15% n-butyllithium in hexane. A butadiene monomer, dried to less than 50 ppm water by circulation through a column packed with 3A molecular sieves, was metered into the reactor at a rate such that the temperature was maintained at 40° F. After an initial exotherm to 48° F., the desired temperature was maintained and a total of 200 lbs. of butadiene was charged over 8 hr. A sample taken after completion of butadiene addition showed 1,2 polybutadiene of greater than 97% 1,2 microstructure and a dilute solution viscosity of 0.20 Dl/g on a 0.5% solution in toluene at 25° C. To the active lithium polymer cement was added 8 lb. of Hylene T (DuPont 2,4-toluene diisocyanate) over 2.3 min with maximum stirring. After sampling for analytical study, 40 lbs. of 25 wt % caprolactam in benzene was charged over 5 minutes and dried to less than 50 ppm water by circulation through 3A molecular sieves. The reaction mixture was diluted by addition of about 200 lbs. of dry hexane, as the dimethyl ether was removed by distillation. Distillation was accomplished by heating the mixture at 220° F. When essentially all of the dimethyl ether end portion of the hexane had been removed, 1.45 kg of distilled water was added and the reaction mixture was cooled, stabilized with antioxidants and dropped into drums as a 54.5% solids cement.

Titration of a polymeric base indicated that 49.5% of the material was amine-terminated, in good agreement with the value of 51% non-coupled material measured by gel permeation chromatography.

EXAMPLE VI

Comparison of Wood Flour Filled 1,2-Poly Bd and Amine-Terminated 1,2-Poly Bd

Samples of resin were compounded in hexane solution (40–60% resin solids) as indicated below. The mixing was done in a Kitchen Aide Mixer. Solvent was removed by drying in a vacuum at 50° C. Test specimens were cured, 10′ at 350° F., in preheated molds. The physical properties measured are tabulated below;

| SAMPLE NO. | 1 | 2 |
|---|---|---|
| 1,2-Polybutadiene | 100 | |
| Amine-terminated 1,2 PBd | | 100 |
| Wood Flour | 100 | 100 |
| Paraformaldehyde | 1 | 1 |
| Dicup 40 | 7.5 | 7.5 |
| Flexural strength psi | 6160 | 10840 |
| Flexural modulus X10$^{-5}$ psi | 5.90 | 5.10 |
| Hardness, Rockwell E | 68 | 65 |
| Izod impact, Notched ft. lb/in | 0.2 | 0.2 |

A significant improvement in flexural strength was noted in the samples prepared with amine-terminated 1,2-polybutadiene.

The elastomeric amine terminated polymers produced according to the present invention can be generally reacted with polyisocyanates and various polymer forming monomers or actual polymers to produce block copolymers which are generally processable at ambient temperatures and yet, upon curing, exhibit physical properties of the added polymer.

According to the concepts of the present invention, the amine terminated polyers described above can generally be reacted under various conditious with amine reactive monomers and polymers to form block or graft copolymers.

A preferred amine reactive compound is a lactam having from 3 to about 15 total carbon atoms. Highly preferred lactams include caprolactam and capryllactam. When such lactams are polymerized, they will yield a nylon block copolymer which is readily processable at the processing temperature of the amine terminated polymer. Thus, when amine terminated 1,2 or 1,4-polybutadiene is used, the processing temperature will be ambient, whereas if amine terminated polystyrene is used, the processing temperature will be approximately 250° F. to 400° F. However when the butadiene portion of the nylon block copolymer is cured, the copolymer will exhibit physical properties largely representative of the nylon constituent of the block copolymer in contrast to the elastomer constituent.

Another class of preferred amine reactive compounds include the various aldehydes, ureas, and phenols to produce a copolymer constituent of urea-aldehyde, or phenol-aldehyde. Depending upon the ratio of the amount of aldehyde to the other component utilized in the formation of urea-aldehyde, and phenol-aldehyde, a block copolymer or a three dimensional graft copolymer network will be produced. Due to the existence of multiple reactive sites on the phenols, the production of phenol-formaldehyde copolymers invariably results in a graft or highly crosslinked network. The block or graft copolymers formed exhibit good processing properties at ambient temperatures as well as at temperatures below the crosslinking temperatures of either the urea-aldehyde or the phenol-aldehyde constituent temperatures.

Yet another class of amine reactive compounds which may be utilized in the preparation of the various polymers are the polyisocyanates or the polyisothiocyanates. The formulations utilized are generally similar, if not identical to those set forth above with respect to the end capping of the elastomeric polymer.

Many other amine reactive compounds such as monomers and polymers exist as known to those skilled in the art. Representative classes of various amine reactive polymers are set forth in U.S. Pat. No. 3,755,261, which is hereby fully incorporated by reference with respect to the general and specific types of amine curable prepolymers or polymers. As set forth by the reference, one representative class of polymers are the epoxy resins such as those described in the "Encyclopedia of Polymer Science and Technology" Interscience Publishers, New York (1967), Volume 6, Pages 212 through 221. Another class of amine reactive polymers are the halogen containing hydrocarbon polymers such as chloroprene polymers, chlorinated butyl rubber and chlorinated polyethylene and polypropylene. Generally, chloroprene polymers are described in the "Encyclopedia of Polymer Science and Technology" Volume 3, (1965), Pages 705 through 728. Yet another class of polymers which are amine reactive are the chlorosulfonated polymers such as those set forth in U.S. Pat. No. 2,723,257. Additionally, various chlorosulfonated monomers are also amine reactive and can therefore be reacted with the amine terminated polymer. A further class of amine reactive polymers are polymers which contain acid halide groups. Various monomers also containing such acid halide groups may be utilized to react with the amine terminated polymer and to form a polymer constituent thereon. Another amine reactive compound are the haloformate groups which may be contained by monomers or by polymers. Another group of amine reactive compounds include monomers or polymers which contain anhydride groups which, upon reaction with an amine, result in an amide-acid linkage and may further react to give an imide. Another polymer which may be reactive with the amine terminated polymers of the present invention are the organopolysiloxanes such as those described in U.S. Pat. No. 2,938,010.

Therefore, the present invention contemplates the production of block copolymers from the amine terminated polymer such as block epoxy copolymers, block urethane copolymers, block urea copolymers, block urethane-urea copolymers and block polyimide copolymers.

In the production of nylon block copolymers, the elastomeric amine terminated polymers described above is connected to a nylon polymer as formed by the polymerization of lactams or the combination of diacidchlorides and diamines or prepolymers thereof to give block copolymers which are readily processable and millable at ambient temperatures and possess excellent physical properties upon cure. Nylon block copolymers made utilizing nylon monomers and prepolymers are highly preferred since they tend to give better properties and are easier to prepare. The polymerization of the nylon constituent is generally via the anionic route and therefore extreme care must be taken to insure that the polymerization environment is substantially free of active hydrogen compounds such as water, alcohols, acids and the like. Therefore, an inert atmosphere such as nitrogen is highly desirable. The required active hydrogen content in the reaction must generally be below 100 parts per million and preferably below 25 parts per million with a content below 5 parts per million being highly preferred, especially with respect to the amount of water in the polymerization system such as a reaction kettle or the like. The reaction may be carried out according to bulk or suspension polymerization techniques with bulk polymerization being preferred for lactams and suspension polymerizastion being preferred for diacid chlorides and diamine. Moreover, since the amine terminated polymers described above tend to be very stable with respect to moisture, impurities and the like, the block polymerization process may be carried out well after the formation of the amine terminated polymer, such as for periods of six months, a year and the like. Of course, before the block polymerization process can be commenced, the amine terminated polymer will have to be substantially purified of active hydrogen compounds such as water as by utilizing a nitrogen purge or by heating to 50°-100° C. under a vacuum of less than about 5 mm of Hg.

Lactams which may be utilized in the formation of the nylon constituent may contain from 2 to about 15 carbon atoms and preferably from 5 to 12 with caprolactam and capryllactam being highly preferred. The temperature of the polymerization can generally range from about 0° C. to about 260° C. with a preferred range being from about 120° C. to about 180° C. Usually no pressure need be applied to the system and the pressure of the system will be determined by the solvent system used as well as the polymerization temperature. Desirable solvents include hexane, toluene and the like so long as they do not contain active hydrogens.

Considering the use of diacid chloride and diamines or salts of diacids and diamines to give a nylon constituent such as nylon 6,6 or 6,10, generally any diacid chloride and diamine compound may be used as well known to those skilled in the art. For example, the chloro acid of adipic acid may be utilized with hexamethylene diamine. Other preferred examples of chloro acids are the aromatic dicarbonyl chlorides containing from 8 to 16 carbon atoms such as terephthaloyl chloride. Preferred examples of diamines include aromatic compounds having from 6 to 15 carbon atoms such as m-phenylene diamine, 2,4-toluene diamine, methylene dianiline and the like. The temperature range for copolymer preparation is usually much narrower than when utilizing lactams and generally ranges from about −20° C. to about 10° C. Lower temperatures result in the diacid chloride and/or the diamine compound precipitating out of solution whereas higher temperatures than the general range tend to hydrochlorinate the amine terminated polymer constituent such as polybutadiene. Although various non-active hydrogen solvents may be utilized, dipolar aprotic solvents are preferred since they tend to pick up any hydrogen chloride formed during the polymerization. Preferred solvents include DMF (dimethylformamide), DMAC (dimethylacetamide), diphenyl and HMPA (hexamethylphosphoroamide) along with an amount of toluene to maintain the amine terminated polymer in solution. The polymerization may be carried out under normal pressure conditions, that is under the pressure generated by the solvent system at the polymerization temperatures.

Although the polymerization of lactams can be carried out with just the amine terminated polymers and monomers since the amine terminated portion of the polymer tends to act as an activator, coactivators may also be used. Toluene diisocyanate is an example of a specific and preferred coactivator. Usually, the polyisocyanates and the polyisothiocyanates, can serve as activators with diisocynates or triisocynates preferred. Generally, any activator may be utilized as well known to those skilled in the art. Examples of additional activators are set forth in U.S. Pat. Nos. 3,017,392, and 3,028,369 which are hereby fully incorporated by reference with respect to such activators. The amount of coactivator will generally depend upon the final average nylon molecular weight desirable with smaller amounts of coactivator being utilized to give higher molecular weights.

To promote polymerization of the lactams to the nylon compound, a basic catalyst is utilized such as sodium hydride, a preferred catalyst. Generally, any sodium, potassium, rubidium, lithium or alkaline earth compound capable of forming a metal salt of a lactam may be utilized as well known to those skilled in the art.

The nylon constituent of the block copolymer may have a molecular weight range of from about 5,000 to about 50,000 with a range of from 10,000 to about 30,000 being preferred. The amount of the amine terminated constituent with respect to the nylon constituent may range from a very low amount such as 5% to a very high amount such as 95% and the block copolymer will generally exhibit processing properties of the amine terminated constituent. Thus, if the amine terminated constituent is an elastomer or more specifically, either 1,2-polybutadiene or 1,4-polybutadiene, the block copolymer may be processed accordingly. Generally, the higher the amount of the amine terminated constituent, the better are the processing properties with amounts of 20% and higher giving very good processing properties. A weight range of the nylon polymer constituent of from about 25% to about 80% is preferred.

The nylon block copolymer can be cured, that is crosslinked, through the use of conventional crosslinking agents such as organic peroxides with dicumyl peroxide being an example of a preferred peroxide.

It has been found that when a particular class of organic peroxides is used to cure the nylon block copolymers, the copolymers exhibit even further improved properties, especially when the base polymer or polybutadiene constituent has a high vinyl content. These organic peroxides can be represented by the following formula;

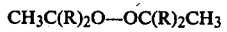
$$CH_3C(R)_2O\text{---}OC(R)_2CH_3$$

wherein R represents aryl or alkyl, including cycloalkyl, aralkyl, alkaryl, etc., of 1–20 carbon atoms, inclusive. Typical R groups include methyl, ethyl, propyl, butyl hexyl, heptyl, decyl, dodecyl, octadecyl, phenyl, tolyl, xylyl, benzyl, phenetyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, and the like.

The organic peroxides of the above formula may be diperoxides or mixed peroxides, that is, peroxides which have two different $CH_3C(R)_2O\cdot$ radicals. Specific examples include dicumyl peroxide, a preferred peroxide, ditertiarybutyl peroxide, tertiarybutyl-cumyl peroxide, ditertiaryamyl peroxide, tertiarybutyltertiaryamyl peroxide, tertiaryamyl-cumyl peroxide, ditertiaryoctyl peroxide, bis(1,1-dipheiyl-ethyl) peroxide, bi (1,1-dicyclohexyl-ethyl) peroxide, bis(1-cyclohexyl-1-methyl-ethyl) peroxide, bis(1-phenyl-1-ethyl-ethyl) peroxide, and the like. The symmetrical peroxides which have identical groups on each side of the peroxy oxygens are generally more available and therefore are preferred. However, mixed peroxides, when available, can be used very satisfactorily.

Whether mixed peroxides or diperoxides of the above class are used to impart to the block copolymers improved properties which are generally more favorable than if ordinary peroxides other than the above class were used, the peroxides used are advantageously those having a reasonably fast rate of decomposition at the temperature employed.

The nylon block copolymers formed when cured possess good physical properties characteristic of nylon such as impact resistance, high abrasion resistance, tensile strength and toughness and can therefore generally be used as an engineering or structural plastic having low flammability. Desired end uses thus include appliance housings, cabinets, rigid panels and the like. If the amine terminated polymer is formed of the 1,4-polybutadiene microstructure and the block copolymer has a high nylon content as in excess of 75%, the block copolymer may be employed as textile fibers and as tire cord similar to the use of nylon. If the amount of nylon content is lower, the 1,4-polybutadiene-nylon block copolymer can be utilized for hoses, flexible pipes and the like. If the block copolymer contains a 1,2-polybutadiene microstructure, it can be used for casters, gears, plastic pipe and the like. Moreover, as with nylon polymers, various conventional fillers and reinforcing agents may be added such as silica and the like. Various fibers such as wood, metal, rayon, etc. may also be added but they tend to greatly reduce the processability of the uncured polymer.

The invention will be more fully understood by reference to the following examples which describe the preparation of various polybutadiene-nylon block copolymers.

EXAMPLE VII

34.5/65.5 1,2Polybutadiene-Nylon 6 Block Copolymer

The preparation of the block copolymer from an amine terminated polymer can be carried out in any reaction vessel capable of withstanding temperatures up to about 200° C., having provisions for mechanical stirring, and capable of maintaining an inert atmosphere and small pressures. The starting materials of an amine terminated polymer and a preferred nylon monomer or prepolymer may be charged in any order as liquids, solids, melts or combinations thereof. Of course, the starting materials must be dried, either separately or in combination to remove water and other low molecular weight impurities. Solutions or liquids may be dried by contacting them with activated molecular sieves or activated alumina whereas solids and melts are preferably dried by subjecting them to a vacuum of less than about 2 millimeters of mercury at temperatures up to 120° C. and preferably at a vacuum of less than 1 millimeter of mercury at 100° C. for 5 to 16 hours.

To a stainless steel resin kettle of 500 milliliter capacity having a mechanical stirrer and a vacuum takeoff was added 102 grams of a cement of a 1,2-polybutadiene amine terminated polymer in hexane approximately 73.5% solids at a molecular weight of about 14,700 g/mole along with 150 grams of flake caprolactam. The mixture was warmed in a warm water bath from about 30° C. to about 50° C. and a vacuum of 30 to about 80 millimeters of mercury applied to remove the bulk of the hexane. The resulting mixture was then heated from about 90° C. to about 105° C. in a Wood's Metal Bath and a vacuum of less than 2 millimeters of mercury was applied and maintained for a 16 hour period with stirring. Nitrogen was then admitted to the resin kettle and a slight nitrogen purge maintained during the remainder of the preparation. To the stirred dry mixture was added 0.45 grams of sodium hydride (58.1% dispersion in mineral oil—11 millimole). After 5 minutes of mixing, 0.75 milliliters of toluene diisocyanate (Hylene TM, 5.27 millimoles) was added. The temperature was slowly raised to 165° C. to 175° C. Agitation was continued until the temperature reached 120°–130° C. and the mixture became too viscous to stir. The polymerization was carried out for 3 hours at 165°–175° C. Upon cooling, the copolymer was removed from the resin kettle and compounded by milling. The milling recipe contained 100 parts of the copolymer, 150 parts of silica 325 mesh, 1.5 parts of Z6075 silane, and 2.0 parts for Dicup R. After curing of 20 minutes at 350° F., the compounded block copolymer gave the following physical properties; flexural strength of 16,210 psi, flexural modulus of $9.88 \times 10^5$ psi, Izod, notched of 0.38 foot pounds per inch, Izod, unnotched of 4.2 foot pounds per inch, Gardner impact strength of 3.7 inch pounds, heat distortion temperature at 264 psi of 222° C., and a Rockwell hardness E scale of 79.

EXAMPLE VIII

20/80 1,2-Polybutadiene—Nylon 6

To a 500 milliliter stainless steel resin kettle was added 50.2 grams of amine terminated 1,2-polybutadiene having 69.7% solids in hexane. The hexane was stripped off by heating to 100° C. under a stream of dry nitrogen. Then, 140 milliliters (140 grams) of dry caprolactam was added as a melt at 100° C. to 115° C. The two components were stirred and 1.139 grams of sodium hydride in mineral oil (40.7 grams/mole sodium hydride or 0.028 mole sodium hydride) was added. After 1 to 5 minutes of stirring, 2.0 milliliters of toluene diisocyanate (0.014 mole of Hylene TM) was added. After stirring for 5 minutes, the stirrer was removed from the reaction mixture and the temperature raised to 160° C.–170° C. and maintained for 3 hours. The resulting sample was milled and a sample compounded. The compounded sample contained 100 parts of the nylon block copolymer, 80 parts of alumina trihydrate, 7.5 parts of ¼" No. 704.71 glass fiber, 1 part of Vulcup R, 1 part of silane, Z6040, and 1 part of silicone oil (DC 550). The compounded material was cured for 10 minutes at 335° F. and gave the following properties: a flexural strength of 7,650 psi, a flexural modulus of $5.09 \times 10^5$ psi and Izod notched in foot pounds per inch of 0.29, an Izod unnotched in foot pounds per inch of 2.5, a Gardner impact in inch pounds of 2.25, a heat distortion temperature of 191° C. at 264 psi and a Rockwell E hardness of 34.

EXAMPLE IX

30/70 1,2-Polybutadiene-Polytoluenediamine terephthalamide

A 1 liter resin kettle was fitted with a turbine stirrer, thermometer, nitrogen inlet and distillation head and was then charged with 40.7 grams of 1,2-polybutadiene amine terminated cement (73.5% solids in hexane) along with 500 milliliters of toluene and 33.9 grams (0.277 moles) of 2,4-toluene diamine. The solution was heated to distill off the hexane and any water present. Upon the vapor temperature reaching 104° C., the mixture was cooled under nitrogen to room temperature and then down to −15° C. to −20° C. in a dry ice-carbon tetrachloride bath. A solution of 56.3 grams (0.277 moles) of distilled terephthaloyl chloride and 125 millimeters of dry dimethylacetamide (DMAC) was prepared in an inert atmosphere (dry box). This solution was placed in a 150 millimeter addition funnel and the traces of acid chloride was rinsed into the funnel with 25 millimeters of DMAC. The addition funnel was stoppered and capped before exposure to air. The addition funnel replaced the distillation head on the resin kettle and the DMAC solution was added rapidly to the amine terminated 1,2-polybutadiene-TDA solution suspension. The reaction temperature was maintained at −15° C. to −20° C. for 6 hours after the initial exotherm (to +15° C.). The reaction mixture was then allowed to warm to room temperature and the polymer was then precipitated in methanol, collected by suction filtration and washed with ice water in a Waring Blender. The blended suspension was treated with sodium carbonate to remove traces of HCl and promote aggregation of the polymer dispersion. The polymer was collected by suction filtration, washed with water and then with methanol and dried in a vacuum for 16 hours at room temperature and then at 3 hours at 60° C. A yield of 93.2% was obtained. A portion of the polymer was compounded as follows; 50 grams of the polymer, 75 grams of silica (325 mesh). 2.0 grams of Dicup R and 0.75 millimeters of Z6075 silane. The compounded polymer was cured for 20 minutes at 350° F. and gave the following physical properties: flexural strength of 8,720 psi, flexural modulus of $10.38 \times 10^5$ psi, Izod notched in foot pounds per inch of 0.25, Izod unnotched in foot pounds per inch of 1.0, Gardner impact in inch pounds of 1.5, heat distortion temperature at 264 psi of 250° C. and a Rockwell E hardness of 95.5. Thermal gravametric analysis (TGA) of a sample of the cured, compounded polymer shows only 4% weight loss in either air or nitrogen up to 438° C. Thus, a highly thermally stable thermoset resin has been produced.

As apparent from the above physical properties, an engineering type thermoset was produced having an exceedingly high flexural modulus.

The 1,2-polybutadiene-nylon block copolymers of the present invention have also been found to produce good engineering rigid thermoset foams. Moreover, it has been found that such foams may possess excellent flame retardancy by proper compounding. Additional advantages of such rigid foams include the facts that they may be made from putty like material and therefore are readily processable or moldable, they do not present dust problems, water can readily be used as a blowing agent thereby reducing health and safety hazards of processing, and that as a thermoset, relatively low processing temperatures such as below 300° F. must be utilized.

In contrast, generally all conventional thermoplastic foams require a high processing and blowing temperature. For example, polycarbonates and polyphenylene oxides require a processing temperature of about 500° F. to about 600° F. Considering thermoplastics which constitute the largest class of foams utilized, the foaming temperatures of polypropylene generally range from 340° F. to 550° F. and for polyphenylene sulfides from 600° F. to about 650° F. Considering the strength of various thermoset foams, phenolics and urea-formaldehyde tend to be friable and therefore weak.

Thermoset rigid foams according to the present invention having good flame retardancy properties are generally formed by adding a coreactive monomer to the block copolymer, a curing agent such as a peroxide, various flame retardants, surfactants to obtain good bubble dispersion and size, various blowing agents and various fillers or reinforcing agents. The block copolymer generally consists of a diene rubber constituent, preferably 1,2-polybutadiene and a nylon constituent, preferably caprolactam or capryllactam. Based upon 100 parts by weight of the block copolymer made according to the concepts of the present invention as set forth above, from 0 to about 150 parts of a coreactive monomer and preferably from about 1 to about 20 parts may be utilized since they decrease viscosity of the composition. If too much coreactive monomer is utilized, the thermoset foam becomes soft or non-rigid, and exhibits reduced flame retardancy and generally lower physical properties. Specific examples of coreactive monomers include styrene, vinyl toluene, diallyphthalate and the like.

The range of the peroxide curing agent is from about 1 to about 40 parts with about 2 to 6 parts being preferred. In general, any conventional peroxide curing agent may be utilized as well known to those skilled in the art with dicumyl peroxide being preferred. Should Dicup 40 be utilized, a larger overall weight amount is generally utilized due of course to the fact that such peroxide contains only about 40% Dicumyl peroxide by weight.

Considering the flame retardant, generally from 0 to 150 parts and preferably from 50 to about 100 parts of any conventional flame retardant compound can be utilized. Specific examples include Thermoguard S 711, M and T Chemical Company. (antimony trioxide), Dow FR 300 BA (decabromo diphenyl oxide) and alumina trihydrate. Generally, amounts at the lower end of the ranges are desired since otherwise the density tends to increase and the various physical properties tend to decrease.

The general range of the surfactants is from 0.1 to about 5 parts with a preferred range of about 0.2 to about 2 parts. These ranges generally provide a good distribution of bubbles as well as bubble size whereas smaller amounts tend to produce a poor dispersion of cell size. On the other hand, excess amounts tend to cause collapse of the bubbles or voids. Any conventional surfactant may be utilized either alone or in combination with each other and a specific preferred surfactant is SF 1034, a silicone surfactant manufactured by General Electric Co.

The general range of the blowing agent to produce the foam is from about 0.5 to about 50 parts by weight and preferably from about 1.0 to about 7.5 parts if a chemical blowing agent is utilized or preferably from 5.0 to about 20 parts if a physical blowing agent is utilized. Many conventional blowing agents may be utilized. Generally, high decomposition temperatures for effective gas yield wherein the decomposition temperature is 150° C. or over are not preferred and compounds having a decomposition temperature of 175° C. and over tend to be incompatible with the process. A preferred blowing agent is Nitrosan manufactured by DuPont, (N,N'-dimethyl-N,N'-dinitroso terephthalamide). Other blowing agents include azobisisobutyronitrile, p,p'-oxybis (benzene sulfonyl hydrazine), azodicarbonamide in conjunction with various decomposition activators known in the art, or dinitrosopentamethylenetetramine in conjunction with various decomposition activators known in the art. Azodicarboxylates are not desired as chemical blowing agents since they tend to undergo an "ene" reaction with polybutadiene at temperatures lower than their effective gas yield temperature. Generally, physical blowing agents which are preferred are those which are compatible or dispersable within the resin formulation and do not interfere with the free radical cure of the resin. As for example hexane, heptane, water, and the like as well as injected inert gases such as nitrogen, neon and the like. In general, the effective gas yield temperature of the chemical blowing agents or the boiling point of the physical blowing agents are generally equal to or preferably lower than the temperature at which the particular peroxide has a half life of about 30 minutes or over. Should activators be utilized, they will generally lower the decomposition or effective gas yield temperatures of the chemical blowing agent.

The general range of the fillers or reinforcing agents is from about 0 to about 150 parts and preferably from about 0 to 50 parts. Usually, amounts in excess of these ranges are not desirable since the formulations are rather stiff and do not readily flow under the internal gas pressure to give good foams. Various conventional fillers well known to those skilled in the art may be utilized such as silica, alumina, chopped glass fibers, and the like.

The flame retardant rigid foam utility of the 1,2-polybutadiene nylon block copolymers will be better understood from the following examples and data.

EXAMPLE X

| | |
|---|---|
| 1,2-PBd-Nylon 6 33/67 | 100 pt |
| Vinyltoluene | 10 pt |
| Dicup R | 4 pt |
| Thermoguard S711 (Sb$_2$O$_3$ M & T Chemical) | 10 pt |
| FR 300 BA (Decabromo Diphenyloxide, Dow Chemical Company) | 20 pt |
| Alumina Trihydrate | 50 pt |
| Nitrosan(DuPont) | 2 pt |
| SF1034 (Silicone Surfactant, G.E.) | 1 pt |
| | 197 pt |

The above formulation was thoroughly mixed and 50 grams of the formulation was cured in a cylindrical mold under atmospheric pressure. The sample was heated at 120° C. for 40 minutes and then at 177° C. for 5 minutes to rapidly cure the 1,2-polybutadiene portion. The resulting free rise rigid foam floated in toluene indicating a density of approximately 0.85 grams per cc. A thin slice (1/16 to 3/32 inches thick) of the foam would burn when held in the flame of a Meeker burner but self-extinguished upon removal from the flame. The slice did not drip either in the flame or after removal from the flame.

In a similar formulation wherein an amount of the block copolymer containing an equilibrium concentration of water was compounded with 2 parts of Dicup R. A 40 gram sample was heated in a cylindrical mold for 2 hours at 300° F. The resultant foam had a density of approximately 0.8 grams per cc and contained an even distribution of fine cells.

EXAMPLE XI

In a manner similar to Example X, the following formulation was cured at 300° F. degrees for 60 minutes in a 3"×1"×¼" mold.

| | |
|---|---|
| 1,2-PBd Nylon 6 | 100 pt |
| Styrene | 25 |
| Dicup R | 5 |
| 1/32" Milled Glass Fiber | 31.25 |
| G.E. SF1034 | 0.75 |
| Z6075 Silane | 0.5 |
| Nitrosan | 0.8. |

The density was approximately 1.1 grams per cc. The thermoset foam exhibited a Rockwell M Hardness of 54, a flexural modulus of 4.27×10$^5$ psi and a flexural strength of 6,150 psi.

EXAMPLE XII

In a manner similar to Example XI the following formulation was heated in a 3"×1"×¼" mold for 60 minutes at 300° F. degrees to produce a thermoset foam having a density of approximately 0.62 grams per cc. This foam gave a Rockwell R hardness of 40, a flexural modulus of 1.15×10$^5$ psi and a flexural strength of 2,280 psi.

The formulation was as follows:

| | |
|---|---|
| 1,2-PBd-Nylon 6 | 100 pt |
| Styrene | 25 pt |
| Dicup R | 5 pt |
| G.E. SF 1034 | 0.75 pt |
| Nitrosan | 0.8 pt |

As apparent from these examples, self-extinguishing or non-burning rigid thermoset foams were produced having good physical properties.

The urea-aldehyde and the phenol-aldehyde compounds and the like constitute another class of monomers, prepolymers and polymers which are amine reactive and can be utilized to produce largely graft copolymers when reacted with the amine terminated polymers, with the monomers and prepolymers being highly preferred due to ease of preparation and better physical properties.

Considering now the non-amine terminated constituent, generally any condensation polymer can be used. For example, in lieu of the formaldehyde portion of the urea/formaldehyde constituent, any linear alkyl aldehyde can be utilized having from 1 to about 15 carbon atoms such as acetaldehyde, propionaldehyde, n-butylaldehyde, n-valeraldehyde, n-caproaldehyde, n-heptaldehyde and the like. Formaldehyde and acetaldehyde are high preferred. Additionally, furfuryl aldehyde and hexamethylene tetramine may also be used. With respect to the urea compound portion of the constituent, generally urea and melamine can be utilized and are preferred. Urea having small hydrocarbon substituents, that is from 1 to 4 carbon atoms, may also be utilized such as 1,3-dimethyl urea and 1,3 diethyl urea as well as urea alcohols having 1 to 5 carbon atoms such as dimethylol urea. With respect to the phenolic compound, generally any phenol type compound having 2 of the 3 ortho and para positions open may be utilized including of course phenol. Thus alkyl phenols such a butyl phenol, the cresols, the dihydric phenols such as resorcinol, catechol and quinol may be utilized as well as many other compounds. Of course, a substituted phenol having any substituted group which would promote other reactions or interfere with the desired polymerization is not desired. Considering the polyvinyl alcohols, any of the polyvinyl alcohol polymers or co-polymers which are reactive with aldehydes or ketones to form acetals or ketals may be used. Examples of such reactive aldehydes and ketones may be found in "Polyvinyl Alcohol" by C. A. Finch, Ed. pp 194–202 John Wiley and Sons, New York, New York (1973), which is hereby incorporated by reference. Most preferred are the aliphatic aldehydes of one to four carbon atoms, particularly formaldehyde, acetaldehyde or butyaldehyde.

In the formation of urea-aldehyde type block copolymers or the phenol-aldehyde type block copolymers, aldehydes such as the chemically active formaldehyde and the less active acetaldehyde will react with the amine compound of the amine terminated polymers. The remaining portion of the block copolymer may be formed largely in accordance with conventional practice.

Thus, under the influence of either acid or base catalysts, phenol type compounds can be reacted with aldehyde type compounds to give phenol-aldehyde copolymers. The first step in the reaction is generally the addition of aldehydes to the ortho or para position of the phenols and, of course, at least 2 free positions are required on the phenol compound in order to permit polymerization. The next step is the novolac formation in which low molecular weight polymers are formed, generally in the presence of an acid catalyst. In the next step or resole formation, the methylol phenols can condense through formation of either methylene linkages or ether linkages in the presence of alkaline catalysts and more aldehyde. In the last stage, decomposition of the ether bridges to methylene bridges yields the copolymer. Due largely to the random reaction and the presence of often more than two reactive positions on the phenol, graft copolymers are generally formed having high molecular weights and therefore are rarely processed.

Due to the formation of resoles and novolacs, the production of phenol-aldehyde copolymers can be made by one stage or two stage processes. In the production of a one stage copolymer, all the necessary reactants such as phenol, aldehydes, catalysts and the like are charged into a resin kettle and reacted together. Any conventional alkaline catalyst can be utilized and the mole ratio of aldehydes such as formaldehyde to phenol is about 1.25–2.25 to 1. In the two stage process, the resins are made utilizing any conventional acid catalyst and only a part of the necessary aldehyde is added to the kettle utilizing mole ratio of about 0.8 to 1. The rest is added at a later point in time often in the form of hexamethylenetetramine, which decomposes in the final curing step, with heat and moisture present, to yield formaldehyde and ammonia; the latter acts as a catalyst for curing.

With respect to the formation of urea type aldehyde copolymer these can generally be formed according to conventional practice once the amine terminated polymer has been reacted with an aldehyde such as formaldehyde. Although the polymerization utilizing area or melamine will be discussed, generally the other urea type monomers set forth above can be polymerized in a similar manner. Initially, the aldehyde type compound reacts with either urea or melamine first by addition to form methylol compounds and then by condensation in reactions much like those of phenol and formaldehyde. Usually, the production of the amino resins is similar to that of the phenol-aldehyde type resins. The mole ratio of aldehyde to melamine may be from about 1.0–3.0 to 1 whereas for urea the ratio is from about 1.0–1.5 to 1.

The temperatures of polymerization are generally from about 90° C. to about 100° C. for phenol-formaldehyde actions and from about ambient temperatures to about 60° C. for urea or melamine-aldehyde reactions. Normally, the only pressure is that generated by the solvent system. Since the urea or melamine type system also tends to produce graft copolymers, the phenol copolymers or the urea copolymers will be branched or crosslinked and therefore very high molecular weights such as from about 50,000 to 300,000 plus will be encountered.

It has been found that the range of the amine polymer constituent such as polybutadiene with either the urea-aldehyde type of phenol-aldehyde type copolymer can range from about 5% to about 95% with from 25% to about 75% being preferred. The amine terminated phenol-aldehyde block copolymer generally has the properties of a thermoset and may be used as molding resins for potting compounds due to their good dielectric properties, as laminating resins, bonding resins, coatings and adhesives and the like. The amine terminated urea-aldehyde type block copolymers may be utilized as molding resins, adhesives, laminating resins and the like. Generally either type of block copolymer may incorporate various filling and reinforcing agents such as silica, glass, and the like with the urea-aldehyde compounds also often being cellulose filled. Additionally, block copolymers according to the present invention tend to form smoother finishes when the amine terminated constituent is an elastomer such as polybutadiene. Moreover, the phenolic-aldehyde block copolymers are well suited as curatives for contact adhesive formulations, replacing alkyl substituted phenolic curative compounds which are required conventional adhesives.

The invention will be better understood by reference to the following examples.

EXAMPLE XIII

75/25 1,2-Polybutadiene/Urea-Formaldehyde

A two liter resin kettle equipped with a mechanical stirrer, thermometer, nitrogen inlet and distillation head was charged with 294 grams of a hexane cement of amine terminated 1,2-polybutadiene having a molecular weight of about 25,000 (50.6% solids or 150.0 g polymer). One liter of heptane was added and the mixture distilled to remove the hexane and any water present until the vapor temperature reached approximately 95° C. Upon cooling, an additional 100 milliliters of heptane and 63 milliliters of 37% formalin (25 grams of formaldehyde) as well as 0.5 grams of sodium hydroxide was added. The distillation head was replaced with a Dean-Stark water separator and reflux condenser. The mixture was heated to reflux for about ½ hour and then 25 grams of crystal urea and 25 milliliters of water were added. Reflux was continued for an additional 1½ hours. The mixture was neutralized by the addition of 0.35 milliliters of 85% phosphoric acid (25.15 millimoles) and reflux was continued overnight (about 18 hours). The total water removed by azeotropic distillation was 70 milliliters (67.5 milliliters expected from 25 milliliters of water and 63 milliliters of formalin charged). The resin was recovered by precipitation in 1,200 milliliters of isopropanol. The supernatant isopropanol solution was decanted and the polymer was dried in a vacuum for about 60 hours to give 197.1 grams (98.5% yield based upon charged materials). The urea-formaldehyde block copolymer was compounded with wood fiber as follows: 100 parts of block copolymer, 100 parts of wood fiber and 2 parts of Dicup R. Samples were molded and cured in four hours at 270° F. to give the following physical properties: flexural strength of 8,490 psi, flexural modulus of $4.91 \times 10^5$ psi, Izod, notched in foot pounds per inch of 0.65, Izod, unnotched in foot pounds per inch of 2.10, Gardner impact in inch pounds of 2.65 and Rockwell E hardness of 55.

EXAMPLE XIV

25/75 1,2-Polybutadiene-Phenol Formaldehyde Block Copolymer

A 2 l resin kettle was fitted with a turbine agitator, a nitrogen inlet, a thermometer and a reflux condenser. The resin kettle was charged with 500 ml of hexane and 100 g of 1,2-polybutadiene amine terminated polymer (50.6% solids in hexane MW 25,000). This mixture was stirred to dissolve and then 100 ml of formalin (37 wt% or 40 g CH₂O charged) was added. After stirring to mix well, 60 g of sodium hydroxide and 94.1 g of molten phenol were added. The entire mixture was heated with stirring to reflux (63° C.) for 2½ hr. The initial rose white color faded to a white during the first 30 min. The apparatus was modified by the addition of a Dean-Stark water separator between the resin kettle and the reflux condenser and water was removed by azeotropic distillation. After 3 hr. 1.0 g of DABCO (1,4 Diaza [2.2.2]-bicycloctane) was added and reflux with water removal was continued. After 19 hrs, 50 ml of water had been removed; the reaction was cooled and 50 ml (20 g CH₂O) of formalin was added. The reaction was again heated to reflux and after a total reflux time of 20.5 hr. an additional 1.0 g of sodium hydroxide was added. At the end of 45 hr reflux the total water collected was 115 ml.

The product was isolated by coagulation in isopropanol, washed twice with methanol and dried in vacuo. The yield was 138.5 g (67.7% of materials charged). The dried stock was mixed on a two roll mill to insure homogeneity and then compounded and cured as shown below.

| Compounding of 25/75 – 1,2-PBdNH₂/Phenol-Formaldehyde | | | |
|---|---|---|---|
| | 1 | 6 | 3 |
| 1,2-PBdNH₂/Phenolic | 100 pt | 100 pt | 100 pt |
| Wood Fiber | 100 pt | 100 pt | — |
| Silica (325 mesh) | — | — | 150 pt |
| Silane z 6075 | — | — | 1.5 pt |
| Dicup R | — | 2 pt | 2 pt |
| Cure | 4 hr at 270° F. | 20 at 350° F. | 20 at 350° F. |

| Physical Properties of 1,2 PBdNH₂/Phenol-Formaldehyde | | | |
|---|---|---|---|
| | 1 | 6 | 3 |
| Flexural Strength × 10⁻³psi | 0.76 | 11.99 | 11.17 |
| Flex. Mod. × 10⁻⁵psi | 0.78 | 8.54 | 9.97 |
| Izod, Notched ft lb/in | 0.67 | 0.34 | 0.28 |
| Izod, Unnotched ft lb/in | 1.3 | 1.7 | 1.7 |
| Gardner Imp. in lb | 4.9 | 3.8 | 1.6 |
| Hardness Rockwell | R41 | E64 | E84 |

EXAMPLE XV

25/75 1,2-Polybutadiene-Phenol Formaldehyde Block Copolymer

In a manner similar to the formation of a block copolymer in Example XIV, a 1,2-Polybutadiene-phenol formaldehyde block copolymer was prepared. Then 100 parts of resin was compounded with 100 parts of wood fiber and 1.2 parts of Dicup R, and then cured. When cured for 3 hours at 300° F., a Rockwell E hardness of 46 was obtained. When another sample was cured for 20 minutes at 350° F., a Rockwell E hardness of 46 was also obtained.

A particular end use of 1,2-polybutadiene-urea/formaldehyde copolymers or the 1,2-polybutadiene-phenol-formaldehyde copolymers prepared from the amine terminated polymer as described above is a waterproof adhesive material for bonding various items together such as wood, wood-metal, metal-metal and the like. In general, such copolymers are prepared as hereinabove described and may contain from 5% to about 95% of the 1,2-polybutadiene constituent. Amounts in excess of 95% result in poor adhesion. A preferred amount of the 1,2-polybutadiene constituent ranges from about 25% to about 75%. Other elastomer constituents may also be used but polybutadiene is preferred due to economic reasons. Concerning the condensation polymer portion constituent, generally any condensation polymer can be used.

The elastomer-urea/formaldehyde or the elastomer-phenolic copolymer adhesives of the present invention are ideally suited for tailor made operations in that the copolymers are of putty like consistency and therefore are easily handled and processed. Such copolymer adhesives furthermore obviate any dust problems normally encountered with conventional urea-formaldehyde adhesives and also exhibit excellent water resistance.

The adhesive utility of 1,2-polybutadiene-urea/formaldehyde copolymers as well as 1,2-polybutadiene-phenol/formaldehyde copolymers will be better understood by the following example.

EXAMPLE XVI

Preparation of 1,2-polybutadiene-phenol/formaldehyde Adhesive Copolymer (25% PBD/75% phenol formaldehyde)

A 200 gram sample of amine terminated 1,2-polybutadiene in hexane (50.6% solids, or 101.2 g of polymer) made in accordance with the above disclosure was added to resin kettle equipped with a mechanical stirrer. The kettle was heated to drive off some of the hexane and one liter of toluene was added and the solvent was distilled until a vapor temperature of 94° C. to 96° C. was achieved. The kettle was then cooled below 70° C. and 200 milliliters of formalin (40% formaldehyde in water), and 2.0 grams of sodium hydroxide was added. The solution was heated to 70° C.–80° C. for 30 minutes under total reflux) and 188.2 grams of molten phenol and 2.0 grams of DABCO (diazobicyclo-octane) was added. The kettle was stirred overnight then fitted with a Dean Stark trap and heated to remove 100 milliliters of water, cooled and then an additional 100 milliliters of formalin was added. The kettle was refluxed overnight to remove an additional 200 cc of water. The solution was dried under a vacuum to give 341.2 grams of copolymer (83.5% yield based on charged materials).

To 5 grams of dried copolymer was added 10 grams of toluene and 0.1 grams of dicumyl peroxide. Several segments of wood tongue depressors (3 inches long, 13/16 inches wide, 3/32 inches thick) were glued together with a 1 inch overlap). The adhesive was cured for 3 hours at 150° C. under various pressures and the adhesive strength determined.

Similarly, a 75/25% 1,2 PBD/phenol formaldehyde adhesive and a 75/25 1,2 PBD/urea formaldehyde copolymers were prepared and used to glue the tongue depressers together utilizing a dicumyl peroxide cure. The results are set forth in Table II.

| Compound | | | | |
|---|---|---|---|---|
| 25/75 1,2-PBD/phenol formaldehyde | | | 100ᵃ | |
| 75/25 1,2-PBD/phenol formaldehyde | 100 | | 100 | 100ᴮ |
| 75/25 1,2-PBD/urea formaldehyde | | 100 | | 100 |

-continued

| Compound | | | | | | | |
|---|---|---|---|---|---|---|---|
| Dicup 40 in Calcium Carbonate | 10 | 10 | 2[a] | 10 | 10 | 10 | 10 |
| Cure Pressure, psi | 300 | 30 | 500 | 2000 | 200 | 1000 | 1000 |
| Average Tensile Strength in lbs. | 277 | 161 | 312 | 640 | 529 | 413 | 552 |

[a]Stock prepared as a solution/suspension in 200 parts of toluene using Dicup R, then air cured for 72 hours and subsequently cured for 20' at 350° C. under 500 psi pressure.
[b]Refluxed in water for 20 hours before testing As readily indicated by the above data, fairly good tensile strength was obtained and the phenol formaldehyde and urea formaldehyde copolymers exhibited excellent water resistance, that is they were insensitive to boiling water degradation.

While in accordance with the Patent Statutes, the preferred embodiments have been illustrated and described in detail, it is to be understood that the invention is not limited thereto, the scope of the invention being measured solely by the scope of the attached claims.

What is claimed is:

1. A process for producing a nylon block copolymer, comprising the steps of;
   anionically polymerizing monomers to form a polymer, said polymer being a homopolymer or a copolymer, said homopolymer made from monomers selected from the class consisting of conjugated diene, vinyl substituted aromatic, vinyl substituted pyridine, vinyl substituted quinoline, and compounds selected from the class consisting of
   1. $CH_2=CACN$ wherein A is CN, $CF_3$, $CH_3$ or H;
   2. $CH_2=CACO_2R$ wherein A is $CO_2R$, $SO_2R$, $CH_3$ or H;
   3. $CH_2=CANO_2$ wherein A is Cl, $CH_3$ or H;
   4. $CH_2=CACON(R)_2$ wherein A is $CH_3$ or H;
   wherein
   R is a hydrogen, an alkyl containing from 1 to 15 carbon atoms, a cycloalkyl containing from 4 to 15 carbon atoms, an aromatic compound containing from 6 to 15 carbon atoms, or a substituted aromatic compound wherein said substituted group is an alkyl containing from 1 to 15 carbon atoms or a cycloalkyl containing from 4 to 15 carbon atoms,
   said copolymer made from monomers of conjugated dienes and vinyl substituted aromatics,
   the molecular weight of said amine terminated polymer ranging from about 3,000 to about 100,000 and the molecular weight of said nylon block copolymer ranging from about 5,000 to about 50,000,
   reacting said anionically prepared polymer with a compound selected from the class consisting of polyisocyanates or polyisothiocyanates to form an end capped polymer, said polyisocyanates or said polyisothiocyanates having the formula $$R+N=C=X)_n$$

wherein
   R is an aliphatic containing from 2 to about 20 carbon atoms, a cycloaliphatic containing from 4 to 20 carbon atoms, an aromatic containing from 6 to 20 carbon atoms, and combinations thereof, n is an integer of 2 or 3 and X is selected from the class consisting of oxygen and sulfur,
   reacting an amide compound with said end capped polymer to form an amide type terminated polymer,
   hydrolyzing said imide terminated polymer to produce an amine terminated polymer,
   reacting said amine terminated polymer with a compound selected from the class consisting of a (a) nylon polymer made from nylon forming monomers so that a nylon block copolymer is formed wherein said nylon polymer is connected to said amine terminated polymer, (b) a nylon prepolymer made from nylon forming monomers, and (c) nylon forming monomers, and
   polymerizing in the presence of said amine terminated polymer said compound selected from the class consisting of said (b) nylon prepolymer made from nylon forming monomers, and (c) said nylon forming monomers to form a nylon polymer so that a nylon block copolymer is formed wherein said nylon polymer is connected to said amine terminated polymer,
   said nylon forming monomers selected from the class consisting of (a) anionically polymerizable lactams having from 3 to 15 carbon atoms, (b) diacid chlorides reacted with diamines, and (c) diacids reacted with diamines so that salts thereof are formed,
   said nylon polymer constituent of said block copolymer ranging from about 5 percent to about 90 percent by weight, and
   the molecular weight of said nylon polymer ranging from about 5,000 to about 50,000.

2. A process according to claim 1, wherein said amide compound is selected from the class consisting of amides of ammonia, amides of primary amines, lactams, sulfonic acid amides, sultams, and a compound having the formula $$\overset{X}{\underset{\|}{R_1-C}}-\overset{H}{\underset{|}{N}}-R_2$$

wherein $R_1$ and $R_2$ is hydrogen, an aliphatic, a cycloaliphatic, an aromatic, and combinations thereof having from 1 to 20 carbon atoms, X is oxygen or sulfur,
   utilizing an equivalent amount of said amide compound to said end capped polyisocyanate polymers ranging from about 1 to about 20,
   utilizing an equivalent amount of said water to said amide compounds ranging from about 1.0 to about 10,
   said diacid chloride is an aromatic dicarbonyl chloride containing from 8 to 16 carbon atoms and wherein said diamine is an aromatic diamine having from 6 to 15 carbon atoms.

3. A process according to claim 2, wherein said amide compound is a compound selected from the class consisting of an amide represented by said formula and said lactams having from 3 to 16 carbon atoms,
   and
   wherein in said polyisocyanate formula, said integer is 2 and X is oxygen.

4. A process according to claim 3, wherein said conjugated dienes have from 4 to 12 carbon atoms and said vinyl substituted aromatic compounds have from 7 to 12 carbon atoms, wherein said copolymer is made from monomers of conjugated dienes having from 4 to 12 carbon atoms and vinyl substituted aromatics having from 7 to 12 carbon atoms, wherein said lactams forming said nylon polymer constituent have from 5 to 12 carbon atoms, and polymerizing said lactam monomers at a temperature ranging from about 0° C. to about 260° C.

5. A process according to claim 3, wherein said anionically prepared homopolymer is made from monomers selected from the class consisting of conjugated dienes having from 4 to 12 carbon atoms, vinyl substituted aromatics having from 7 to 12 carbon atoms, vinyl substituted pyridine, and vinyl substituted quinoline.

said vinyl substituted pyridine monomers are selected from the class consisting of 2-vinylpyridine, 3-vinylpyridine, 4-vinylpyridine, 3-ethyl-5-vinylpyridine, 3-methyl-5-vinyl-pyridine, 3,5-diethyl-4-vinylpyridine, and said quinoline monomers are selected from the class consisting of 2-vinylquinoline, 3-vinylquinoline, and 4-vinylquinoline, wherein said anionically prepared copolymer is made from monomers of conjugated dienes having from 4 to 12 carbon atoms and vinyl substituted aromatics having from 7 to 12 carbon atoms, wherein said nylon polymer constituent is made from monomers selected from the class consisting of (a) lactams having from 3 to 15 carbon atoms and (b) aromatic dicarbonyl chlorides containing from 8 to 16 carbon atoms reacted with aromatic diamines having from 6 to 15 carbon atoms, and polymerizing said nylon forming monomers at a temperature of from about 0° C. to about 260° C.

6. A process according to claim 5, wherein said lactam monomer forming said nylon polymer constituent is selected from the class consisting of caprolactam and capryllactam, wherein said aromatic dicarbonyl chloride is terephthaloyl chloride and wherein said aromatic diamine is selected from the class consisting of phenylene diamines, 2,4-toluene diamine and methylene dianiline, wherein said $R_2$ of said amide formula is hydrogen or an aromatic and said amide formula compound wherein X is oxygen or sulfur is selected from the class consisting of formamide, acetamide, stearamide, oleamide, acetanilide, benzamide, and benzanilide, thioformamide, thioacetamide, thiostearamide, thiooleamide, thioacetanilide, thiobenzamide, and thiobenzanilide, and wherein said lactam amide is selected from the class consisting of caprolactam and capryllactam, and wherein said anionically prepared homopolymer is made from monomers selected from the class consisting of 1,3-butadiene, isoprene, styrene, vinyltoluene, and 4-t-butylstyrene, and wherein said copolymer is a copolymer of styrene and butadiene.

7. A process according to claim 6, wherein the amount of said nylon polymer constituent ranges from 25 percent to about 80 percent based upon the total weight of said block copolymer, the molecular weight of said nylon constituent ranges from about 10,000 to about 30,000 and wherein the polymerization temperature of said lactams ranges from about 120° C. to about 180° C.

8. A process according to claim 7, wherein said diisocyanate is selected from the class consisting of paraphenylene diisocyanate, meta-phenylene diisocyanate, diphenyl methane diisocyanates, dianinsidine diisocyanates, isophorone diisocyanates, toluene diisocyanates, bitolylene diisocyanates, hexamethylene diisocyanate and penta-methylene diisocyanate.

9. A process according to claim 7, wherein said homopolymer is made from dienes having from 4 to 12 carbon atoms, and including the step of making a foam by adding for every 100 parts of said polymer (a) 0 to 150 parts by weight of a coreactive monomer, (b) from 1 to 40 parts by weight of a peroxide curing agent, and (c) from 0.5 to 50 parts of a blowing agent.

10. A process according to claim 9, wherein the amount of said coreactive compound ranges from 1 to 20 parts and is selected from the class consisting of styrene, vinyltoluene, and diallylphthalate, wherein the amount of said peroxide curing agent ranges from about 2 to about 6 parts by weight and wherein said blowing agent is selected from the class consisting of a physical and a chemical blowing agent, the amount of said physical blowing agent ranges from about 5.0 to about 20.0 parts, the amount of said chemical blowing agent ranges from about 1.0 to about 7.5 parts and has a decomposition temperature of 150° C. or less, said chemical blowing agent is selected from the class consisting of N,N'-dimethyl-N,N'-dinitrosoterephthalamide, azobisiobutyronitrile, p,p'-oxybis(benzene sulfonyl hydrazine), azodicarbonamide in conjunction with a decomposition activator, and dinitrosopentamethylenetetramide in conjunction with a decomposition activator.

11. A process according to claim 10, wherein said amine terminated polymer is poly-1,2-butadiene, said nylon polymer constituent is made from monomers selected from the class consisting of caprolactam and capryllactam, and said physical blowing agent is selected from the class consisting of inert gases, hexane, heptane, and water.

* * * * *